(12) United States Patent
Satou et al.

(10) Patent No.: US 7,078,692 B2
(45) Date of Patent: Jul. 18, 2006

(54) ON-VEHICLE NIGHT VISION CAMERA SYSTEM, DISPLAY DEVICE AND DISPLAY METHOD

(75) Inventors: Masanori Satou, Atsugi (JP); Nobuhiro Hama, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/034,974

(22) Filed: Jan. 14, 2005

(65) Prior Publication Data
US 2006/0043295 A1    Mar. 2, 2006

(30) Foreign Application Priority Data
Jan. 23, 2004    (JP) .............................. 2004-015458

(51) Int. Cl.
*G02F 1/01*    (2006.01)
(52) U.S. Cl. ..................................... 250/330
(58) Field of Classification Search ................. 250/330
See application file for complete search history.

(56) References Cited

U.S. PATENT DOCUMENTS

| 2003/0007074 | A1 | 1/2003 | Nagaoka et al. |
| 2003/0169491 | A1 | 9/2003 | Bender et al. |
| 2004/0017282 | A1* | 1/2004 | Eguchi et al. ........... 340/425.5 |
| 2005/0206510 | A1* | 9/2005 | Weber et al. ............... 340/435 |

FOREIGN PATENT DOCUMENTS

| EP | 1 291 243 A2 | 3/2003 |
| WO | WO 02/34572 A1 | 5/2002 |

OTHER PUBLICATIONS

"Night Vision System" The Toyota Land Cruiser New Model Brochure, Aug. 2002 pp. 22 (Partial English Translation Included).

* cited by examiner

*Primary Examiner*—David Porta
*Assistant Examiner*—Marcus Taningco
(74) *Attorney, Agent, or Firm*—McDermott Will & Emery LLP

(57) ABSTRACT

In an system in which a night vision image photographed with an infrared camera installed at a vehicle is displayed at a head-up display, the display state of the night vision image displayed at the head-up display is changed as a high beam switch enters an ON state to allow the driver to check the image of the field far ahead on the head-up display.

11 Claims, 2 Drawing Sheets

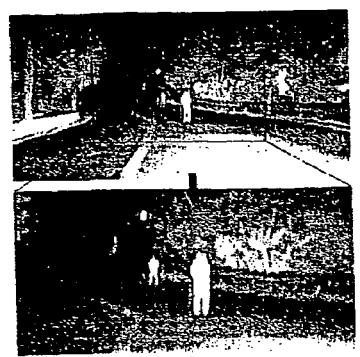
FIG.3A
FIG.3B
FIG.4A
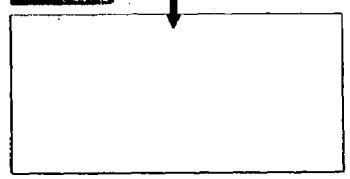
FIG.4B
FIG.5
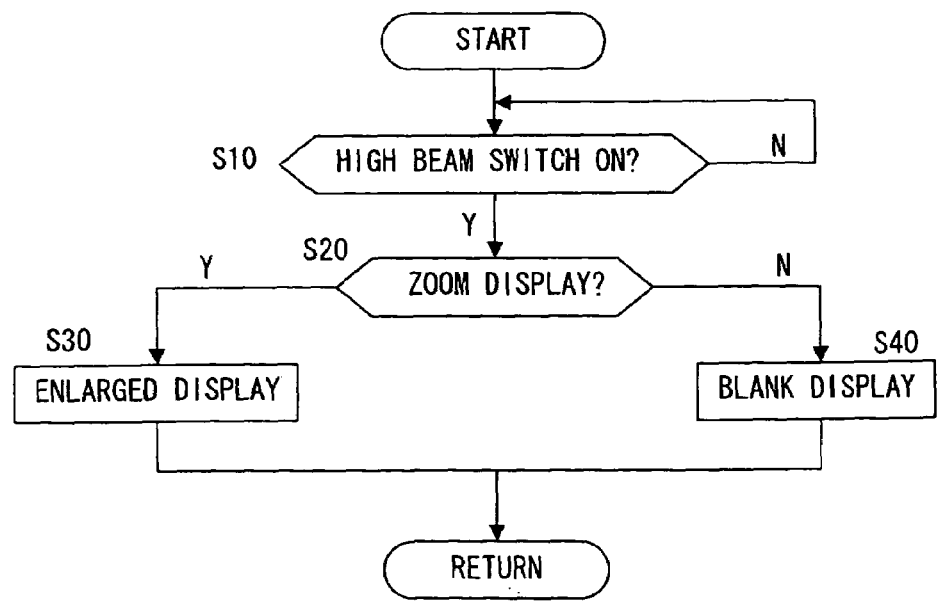

ON-VEHICLE NIGHT VISION CAMERA SYSTEM, DISPLAY DEVICE AND DISPLAY METHOD

BACKGROUND OF THE INVENTION

1. Field of the Invention

The present invention relates to an on-vehicle night vision camera system, a display device and a display method, to be adopted to display at a display means an image of the area ahead of the vehicle photographed with an infrared camera.

2. Description of the Related Art

There is a night vision system known in the related art that photographs the area ahead of the vehicle with an infrared camera at night and displays the night view image thus photographed on a head-up display (see "Night Vision System" in the Toyota Land Cruiser new model brochure (issued in August, 2002)).

SUMMARY OF THE INVENTION

However, since the display at the head-up display unit does not change even when the headlights of the vehicle are set to high beams in order to check the area ahead of the vehicle over a longer range, a satisfactory level of long-range visibility may not always be assured in the system in the related art.

An on-vehicle night vision camera system according to the present invention includes an infrared camera which photographs an area ahead of the vehicle, a display device at which a night vision image photographed with the infrared camera is displayed, a headlight state detection device that detects a high beam setting of headlights of the vehicle and a display state changing device that changes a display state of the night vision image displayed at the display device when the headlight state detection device detects that the headlights have been switched to the high beam setting.

A display device at which the night vision image photographed with an infrared camera used to photograph an area ahead of a vehicle is displayed includes an input device through which a signal indicating that headlights of the vehicle have been switched to high beams is input and a display control device that changes a display state of the night vision image when the signal indicating the high beam setting of the headlights is input to the input device.

In a display method for displaying at a display device a night vision image photographed with an infrared camera used to photograph an area ahead of a vehicle, a high beam setting of headlights at the vehicle is detected and a display state of the night vision image displayed at the display device is changed if the headlights are detected to have been switched to the high beam setting.

BRIEF DESCRIPTION OF THE DRAWINGS

FIG. 3A is a standard display before the image is enlarged and FIG. 3B shows an image achieved by enlarging a central area of the image in FIG. 3A;

FIG. 4A shows a standard image and FIG. 4B shows a blank screen after the image having been on display at the head-up display is erased; and FIG. 5 presents a flowchart of the processing executed in the on-vehicle night vision camera system in the embodiment.

DETAILED DESCRIPTION OF THE PREFERRED EMBODIMENT

Figure 1:
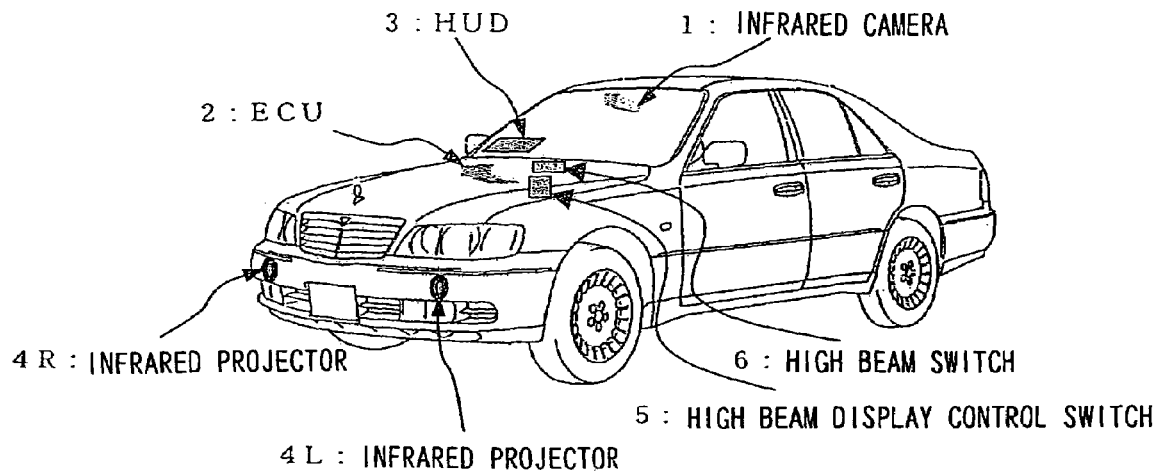
FIG. 1 shows the overall structure adopted in an embodiment of the on-vehicle night vision camera system according to the present invention.
Figure 2:
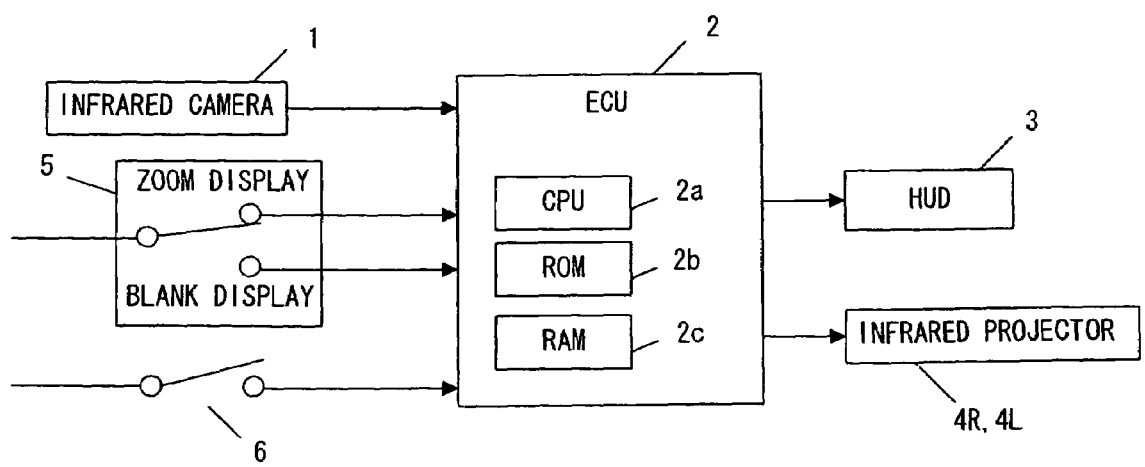
FIG. 2 is a block diagram of the on-vehicle night vision camera system achieved in the embodiment.

FIG. 1 shows a vehicle having installed therein the on-vehicle night vision camera system achieved in an embodiment. FIG. 2 is a block diagram of the on-vehicle night vision camera system achieved in the embodiment. The on-vehicle night vision camera system in the embodiment comprises an infrared camera 1, an electronic control unit 2 (hereafter referred to as an ECU 2), a head-up display (HUD) 3, infrared projectors 4R and 4L, a high beam display control switch 5 and a high beam switch 6.

The infrared camera 1 mounted at the top of the front windshield photographs the area ahead of the vehicle. As the infrared camera 1 receives near-infrared light having a wavelength that is not visible to the human eye, it is able to photograph people and objects at night. The infrared projectors 4R and 4L, which may be mounted at, for instance, the front bumper, project the near-infrared light along the forward direction relative to the vehicle so as to enable the infrared camera 1 to photograph an image ahead of the vehicle. At the head-up display 3 installed at the front windshield and positioned so that a display thereupon can be visually checked by the driver with ease, at least the image (night vision image) photographed with the infrared camera 1 is displayed.

The headlights (headlamps) of the vehicle can be switched to a high beam position or a low beam position with a light switch (not shown). The high beam switch 6 enters an ON state as the headlights are switched to the high beam setting and enters an OFF state as the headlights are switched to the low beam setting.

The ECU 2 includes a CPU 2a, a ROM 2b and a RAM 2c. The ECU 2 changes the display state of the night vision image displayed at the head-up display 3, i.e., the image captured with the infrared camera 1 for a following method, when the high beam switch 6 is turned on.

The high beam display control switch 5 is operated by the driver to switch to a zoom display or a blank display. When the high beam display control switch 5 is set to the zoom display and the headlights are switched to the high beam setting, the ECU 2 executes digital zoom processing on the night vision image. As a result, the night vision image is displayed in an enlargement at the head-up display 3.

FIGS. 3A and 3B respectively show a regular-size night vision image and an enlarged night vision image on display. FIG. 3A shows a night vision image photographed with the infrared camera 1. The image in FIG. 3A is a normal image that has not undergone the digital zoom processing. The white area at the center of the display screen in FIG. 3A is a person. FIG. 3B shows an image achieved by executing the zoom processing on the image shown in FIG. 3A. The person at the center of the screen in FIG. 3A is enlarged in the display shown in FIG. 3B.

By displaying the night vision image photographed with the infrared camera 1 in an enlargement at the head-up display 3 when the headlights are switched to the high beam setting as described above, an area over a longer range ahead of the vehicle can be displayed in an enlargement. Namely, an image satisfying the need of the driver to check for objects far ahead of the vehicle can be displayed.

If, on the other hand, the headlights are switched to the high beam setting when the high beam display control switch 5 is set to the blank display, the ECU 2 erases the night vision image on display at the head-up display 3. FIG. 4A shows an example of a night vision image that may be displayed at the head-up display 3, and FIG. 4B shows a blank screen achieved by erasing the night vision image in FIG. 4A.

Some drivers may prefer to check the area far ahead of the vehicle with their own eyes with the headlights switched to the high beam setting. With the night vision image on the head-up display 3 erased, such a driver is able to check the area ahead of the vehicle through the windshield with ease.

Namely, the ECU 2 changes the display state of the night vision image displayed at the head-up display 3 to allow the driver to check the area far ahead of the vehicle when the high beam switch 6 is turned on.

FIG. 5 presents a flowchart of the processing executed in the on-vehicle night vision camera system in the embodiment. The processing, which starts in step S10, is executed by the CPU 2a in the ECU 2. In step S10, a decision is made as to whether or not the high beam switch 6 has been turned on based upon a signal input from the high beam switch 6. If it is decided that the high beam switch 6 has been turned on, the operation proceeds to step S20, whereas if it is decided that the high beam switch 6 has not been turned on, the operation waits in standby in step S10.

In step S20, a decision is made as to whether or not the high beam display control switch 5 is currently set to the zoom display based upon a signal input from the high beam display control switch 5. The operation proceeds to step S30 if it is decided that the high beam display control switch 5 is currently set to the zoom display, whereas the operation proceeds to step S40 if it is decided that the high beam display control switch 5 is currently set to the blank display.

In step S30, digital zoom processing is executed on the central area of the night vision image photographed with the infrared camera 1 and an image containing an enlarged front area is displayed at the head-up display 3. In step S40, on the other hand, no night vision image is displayed at the head-up display 3. Namely, if a night vision image is currently displayed at the head-up display 3, processing is executed to erase the image on display. Once the processing in step S30 or in step S40 is executed, the operation returns to step S10. Subsequently, the processing, which starts in step S10, is repeatedly executed.

As the headlights of the vehicle are set to high beams (to the high beam setting), the display state in which the night vision image photographed with the infrared camera displayed at the head-up display is changed in the on-vehicle night vision camera system in the embodiment. As a result, an image satisfying the need of the driver to check the field far ahead can be displayed at the head-up display.

In more specific terms, when the headlights of the vehicle are set to high beams (to the high beam setting), the night vision image photographed with the infrared camera is displayed in an enlargement at the head-up display in the on-vehicle night vision camera system in the embodiment to allow the driver to check the image of the field far ahead on the head-up display.

In addition, the on-vehicle night vision camera system in the embodiment provides an option of not having any night vision image displayed at the head-up display when the headlights of the vehicle are switched to high beams (to the high beam setting). This option allows the driver to easily check with his own eyes the area far ahead irradiated with visible light by the high beams.

The present invention is not limited to the example presented in the embodiment explained above. For instance, the night vision image photographed with the infrared camera may be displayed at a display device such as an in-vehicle monitor used in conjunction with a car navigation system, instead of at a head-up display. In addition, the control device may be built into the display device so as to change the display state of the night vision image in response to a signal indicating that the headlights of the vehicle have been set to high beams input to the display device.

While an explanation is given above on an example in which the headlights of the vehicle can be switched to the high beam setting or the low beam setting, the present invention may be adopted in conjunction with headlights whose range can be switched over multiple stages, i.e., three stages or more. Namely, when such headlights are set to high beams to irradiate the field further ahead, the display state of the night vision image displayed at the display device such as a head-up display should be adjusted.

While the central area of the night vision image photographed with the infrared camera 1 is enlarged when displaying an enlarged night vision image in the on-vehicle night vision camera system in the embodiment, an area other than the central area of the image may be enlarged. For instance, the ECU 2 may execute image processing on the photographed image, identify any person in the image and then enlarge the portion of the image over which the identified person is photographed. In addition, while digital zoom processing is executed in order to display the enlarged image, an image obtained by photographing the area far ahead with a zoom lens may instead be displayed.

While the image currently displayed at the head-up display is erased if the high beam display control switch 5 is switched to the blank display setting, the display may be, for instance, darkened to an extent substantially equivalent to the state of blank display so as to make the image substantially invisible to the driver. Namely, with the night vision image at the head-up display eliminated from the field of view of the driver, the driver is able to focus on the area ahead of the vehicle irradiated with high beams.

While the "zoom display" or the "blank display" can be selected with the high beam display control switch 5 in the on-vehicle night vision camera system in the embodiment, the on-vehicle night vision camera system may include another setting "normal display" at which the display state is not switched. When the driver selects the "normal" display in such an on-vehicle night vision camera system, the display state of the night vision image displayed on the head-up display 3 remains unchanged even when the headlights are switched to the high beam setting. Namely, the initial night vision image photographed with the infrared camera 1 remains on display at the head-up display 3.

The disclosure of the following priority application is herein incorporated by reference:
Japanese Patent Application No. 2004-15458 filed Jan. 23, 2004

What is claimed is:
1. An on-vehicle night vision camera system, comprising:
an infrared camera installed at a vehicle, which photographs an area ahead of the vehicle;
a display device at which a night vision image photographed with the infrared camera is displayed;
a headlight state detection device that detects a high beam setting of headlights of the vehicle; and
a display state changing device that changes a display state of the night vision image displayed at the display device when the headlight state detection device detects that the headlights have been switched to the high beam setting.

2. An on-vehicle night vision camera system according to claim 1, wherein:
the display device is a head-up display; and
the display state changing device eliminates the night vision image displayed at the head-up display from the field of view of the driver.

3. An on-vehicle night vision camera system according to claim 2, wherein:
the display state changing device erases the image displayed at the display device.

4. An on-vehicle night vision camera system according to claim 1, wherein:
the display state changing device displays the night vision image photographed with the infrared camera in an enlargement at the display device.

5. An on-vehicle night vision camera system according to claim 1, further comprising:
an image processing device that detects a person in the night vision image by executing image processing on the night vision image photographed with the infrared camera, wherein:
the display state changing device displays at the display device an image achieved by enlarging an area of the night vision image, which contains the person detected by the image processing device.

6. An on-vehicle night vision camera system according to claim 1, wherein:
the display state changing device executes either of a first control mode in which the night vision image displayed at the display device is eliminated from a field of view of the driver and a second control mode in which the night vision image photographed with the infrared camera is displayed in an enlargement at the display device.

7. An on-vehicle night vision camera system according to claim 6, wherein:
the display state changing device executes either of the first control mode and the second control mode in response to a command issued by the driver.

8. An on-vehicle night vision camera system that displays at a display device a night vision image photographed with an infrared camera used to photograph an area ahead of a vehicle, wherein:
a display state of the night vision image displayed at the display device is changed if headlights of the vehicle are judged to have been switched to high beams.

9. An on-vehicle night vision camera system, comprising:
an infrared camera installed at a vehicle, which photographs an area ahead of the vehicle;
a display means for displaying a night vision image photographed with the infrared camera;
a headlight state detection means for detecting a high beam setting of headlights of the vehicle; and
a display state changing means for changing a display state of the night vision image displayed at the display means when the headlight state detection means detects that the headlights have been switched to the high beam setting.

10. A display device at which the night vision image photographed with an infrared camera used to photograph an area ahead of a vehicle is displayed, comprising:
an input device through which a signal indicating that headlights of the vehicle have been switched to high beams, provided by a headlight state detection device that detects a high beam setting of the headlights, is input; and
a display control device that changes a display state of the night vision image when the signal indicating the high beam setting of the headlights is input to the input device.

11. A display method for displaying at a display device a night vision image photographed with an infrared camera used to photograph an area ahead of a vehicle, comprising steps for:
detecting a high beam setting of headlights at the vehicle; and
changing a display state of the night vision image displayed at the display device if the headlights are detected to have been switched to the high beam setting.

* * * * *